United States Patent
Wong et al.

(10) Patent No.: US 7,162,606 B2
(45) Date of Patent: Jan. 9, 2007

(54) MULTIPLE SEGMENT DATA OBJECT MANAGEMENT

(75) Inventors: Wanmo Wong, Menlo Park, CA (US); Karunakaran Muthusamy, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 121 days.

(21) Appl. No.: 10/975,665

(22) Filed: Oct. 28, 2004

(65) Prior Publication Data

US 2005/0086422 A1    Apr. 21, 2005

Related U.S. Application Data

(62) Division of application No. 10/232,822, filed on Aug. 29, 2002, now Pat. No. 6,970,969.

(51) Int. Cl.
*G06F 12/04*    (2006.01)

(52) U.S. Cl. ............... 711/170; 711/171; 711/172; 711/173

(58) Field of Classification Search ............ None
See application file for complete search history.

(56) References Cited

U.S. PATENT DOCUMENTS

| | | | | |
|---|---|---|---|---|
| 4,580,211 A | 4/1986 | Doki et al. | | 364/200 |
| 5,394,531 A | 2/1995 | Smith | | 395/425 |
| 5,778,442 A | 7/1998 | Ezzat et al. | | 711/159 |
| 6,105,115 A | 8/2000 | Mathews et al. | | 711/160 |
| 6,125,424 A | 9/2000 | Komatsu et al. | | 711/103 |
| 6,141,251 A | 10/2000 | Xing | | 365/185.11 |
| 6,141,731 A | 10/2000 | Beardsley et al. | | 711/136 |
| 6,202,122 B1 | 3/2001 | Yamada | | 711/103 |
| 6,226,728 B1 * | 5/2001 | See et al. | | 711/171 |
| 6,327,644 B1 | 12/2001 | Beardsley et al. | | 711/136 |
| 6,378,043 B1 | 4/2002 | Girkar et al. | | 711/133 |
| 6,401,160 B1 * | 6/2002 | See et al. | | 711/5 |
| 6,427,186 B1 | 7/2002 | Lin et al. | | 711/103 |
| 6,651,116 B1 | 11/2003 | Ludwig et al. | | 710/33 |
| 6,732,222 B1 | 5/2004 | Garritsen et al. | | 711/103 |
| 6,735,678 B1 | 5/2004 | Noble et al. | | 711/165 |
| 2003/0163660 A1 | 8/2003 | Lam | | 711/170 |
| 2004/0044836 A1 | 3/2004 | Wong et al. | | 711/103 |
| 2004/0044840 A1 | 3/2004 | Wong | | 711/105 |
| 2004/0044858 A1 | 3/2004 | Wong et al. | | 711/156 |
| 2004/0044859 A1 | 3/2004 | Wong | | 711/156 |
| 2004/0044869 A1 | 3/2004 | Louie et al. | | 711/165 |
| 2004/0044873 A1 | 3/2004 | Wong et al. | | 711/218 |

OTHER PUBLICATIONS

Bach, Maurice J., "The Design of the Unix® Operating System", Bell Telephone Laboratories, Inc., Prentice-Hall, Inc., Englewood Cliffs, New Jersey, 1986, pp. xi-xiv and 271-311.

(Continued)

*Primary Examiner*—T Nguyen
(74) *Attorney, Agent, or Firm*—Dorsey & Whitney LLP

(57) ABSTRACT

A multiple segment data structure and method manage data objects stored in multiple segments. The structure and method use one or more multiple segment index table objects containing defining information about the data objects in which the data are stored, such as the state, index table size, and one or more index tables referencing the data segment objects. The data objects themselves comprise a header, specifying information about the data segment, including a data segment state, and a data section in which data actually are stored. The state fields in the index table object and the data segment objects facilitate the data recovery process.

36 Claims, 9 Drawing Sheets

OTHER PUBLICATIONS

Int_l® "Intel® Flash Data Integrator (FDI) User's Guide", Version 4, Aug. 2001, pp. ii-314.

Jones, Richard, et al., "Garbage Collection Algorithms for Automatic Dynamic Memory Management", John Wiley & Sons Ltd., Chichester, England, 1996, pp. vii-xxvi and 1-41.

Silberschatz, Abraham et al., "Operating System Concepts, Fifth Edition", Addison Wesley Longman, Inc., 1998, pp. v-xvii and 239-336.

Tanenbaum, Andrew S., "Operating Systems: Design and Implementation", Prentice Hall, Inc., Englewood Cliffs, New Jersey, 1987, pp. vii-xvi and 191-250.

* cited by examiner

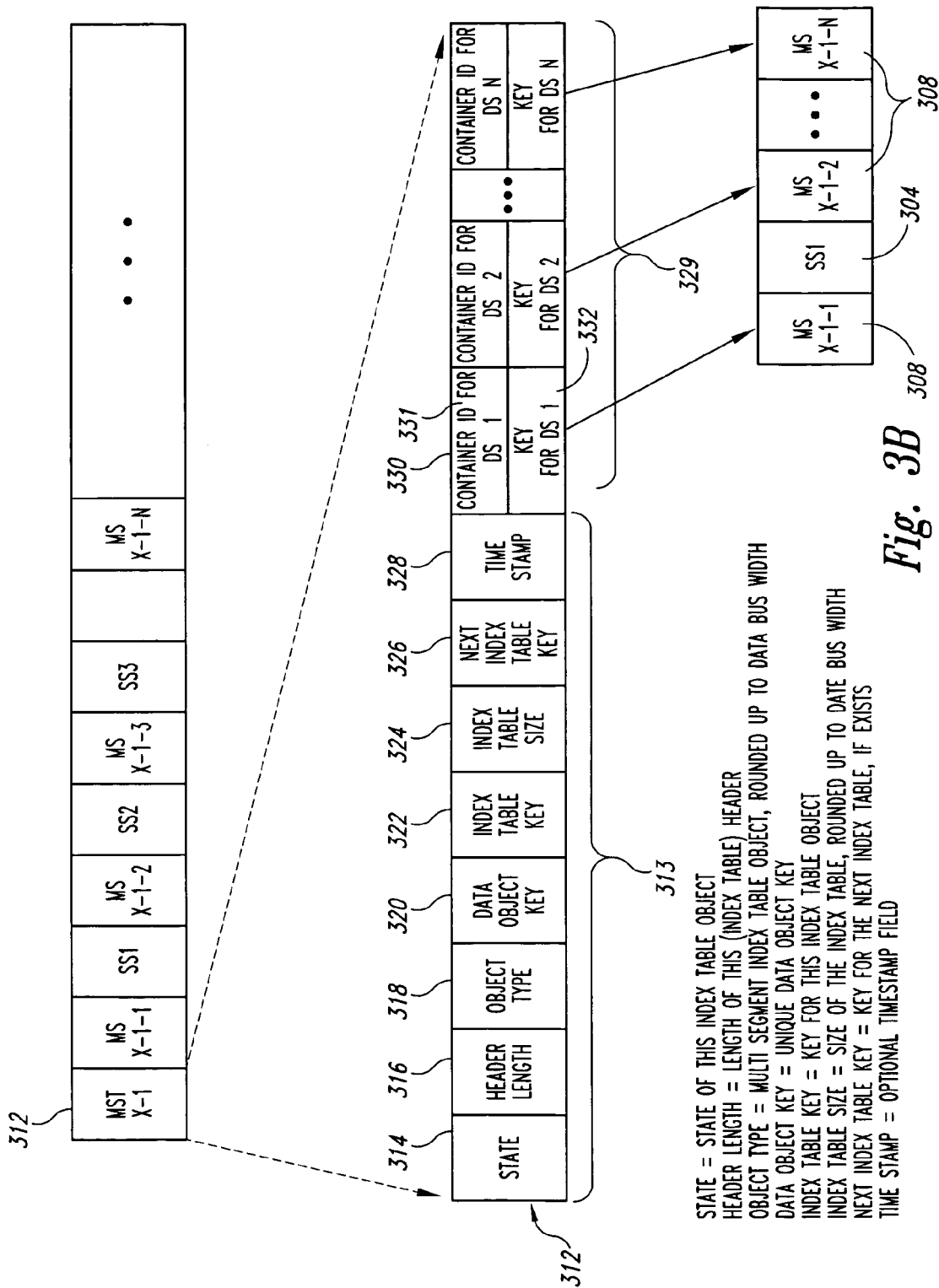

| NUMBER | STATE | BINARY VALUE | POWER LOSS RECOVERY ACTION | NEXT STATE | ACTION FOR NEXT STATE |
|---|---|---|---|---|---|
| 001 | EMPTY | 1111 1111 | NONE | WRITING_HDR_LEN | WRITE STATE AND LENGTH |
| 002 | WRITING_HDR_LEN | 1111 1110 | SKIP HEADER STATE AND LENGTH FIELDS | WRITING_HDR | WRITE STATE AND HEADER RECORD |
| 003 | WRITING_HDR | 1111 1100 | SKIP HEADER | WRITTEN_HDR | WRITE STATE |
| 004 | WRITTEN_HDR | 1111 1000 | SKIP HEADER AND DATA | WRITING_DATA | WRITE STATE AND DATA |
| 005 | WRITING_DATA | 1111 0000 | SKIP HEADER AND DATA | WRITTEN_DATA | WRITE STATE WHEN FINISH WRITING DATA |
| 006 | WRITTEN_DATA | 1110 0000 | CHANGE STATE TO VALID_DATA | VALID_DATA | WRITE STATE |
| 007 | VALID_DATA | 1100 0000 | NONE | INVALID_DATA | WRITE STATE |
| 008 | INVALID_DATA | 1000 0000 | SKIP HEADER AND DATA | EMPTY | ERASE FLASH BLOCK |

Fig. 3C

MULTIPLE SEGMENT DATA OBJECT MANAGEMENT

This application is a divisional of U.S. patent application Ser. No. 10/232,822, filed Aug. 29, 2002 now U.S. Pat. No. 6,970,969.

TECHNICAL FIELD

The present invention relates to semiconductor memory devices. More particularly, the present invention relates to improving data management in semiconductor memory devices, such as flash memory devices.

BACKGROUND OF THE INVENTION

Non-volatile memory is a type of memory that can retain data and information even when power is not applied. An example of non-volatile memory that is being used in a variety of applications, such as cellular phone technology, is "flash memory." Flash memory is a form of electrically erasable programmable read-only memory (EEPROM), where data can be written in bytes and erased in blocks of memory. The blocks of memory typically range from 8 kBytes to 1 MByte in size. The cell density of flash memory devices can be very high, often as high as conventional dynamic random access memory (DRAM) cells, since in conventional flash memory a single floating gate structure is used for each memory cell. Flash memory devices also have relatively fast data access times. In the past, flash memory has been used in applications such as storing basic input/output system (BIOS) information in personal computers. However, with improvements in programming capabilities, and the continually increasing demand for persistent and low-power memory devices, the application of flash memory in many other areas has expanded very rapidly.

As previously mentioned, one such application is in cellular phones. At one time, cellular phones were only limited to voice communication. Now, cellular phones provide Internet access and web browsing capabilities, allow a user to capture and store computer graphic images, capture and playback video images, and provide personal digital assistant (PDA) capabilities. As a consequence, cellular phones need to be able to store different types of data and information. For example, whereas older cellular phones would only need to store data representing phone numbers, newer cellular phones need to store in addition to phone numbers, voice information, computer graphic images, small applications (e.g., Java applets) downloaded from the Internet, and the like.

The various data objects that must be stored by the flash memory have different characteristics. For example, data such as phone numbers are generally small segments of data having uniform length. Other data can be variable in length, such as voice information, where the amount of memory used depends on the length of voice information recorded. Data can be packetized, as in the case where data is downloaded from the Internet. Additionally, the amount of memory consumed by data such as voice information and image files can be considerable, spanning multiple blocks of flash memory. Application code, such as a Java applet, is unique in that the binary code must be stored contiguously in flash memory to allow for the code to be executed by a processor directly from the flash memory.

Flash memory, which is non-volatile, and has low operating power, is perfectly suited for data and information storage applications such as in cellular phones where conservation of power is very desirable. However, the operating characteristics of flash memory must be adapted to facilitate storage of the different types of data and information previously described.

Flash memory, although providing many of the characteristics required for applications in portable and remote (wireless) devices, have unique operational characteristics that need to be considered. For example, because of the floating gate structure of conventional flash memory cells, data cannot be simply overwritten. The memory cells must be erased prior to writing new data. Also, as previously mentioned, flash memory devices are designed to erase data in blocks of memory cells, rather than on a cell-by-cell basis. Thus, although only a portion of the memory cells of a block need to be updated, the entire block must be first erased before programming the new data. The process of erasing an entire block of memory cells and programming new data takes a relatively long time to complete, and deferring an erase operation is often desirable. Additionally, erasing the entire block is a problem, however, in the case where another portion of the memory cells of the block do not need to be updated. Another issue related to flash, and other floating gate memory devices, is that these memory cells have a limited life-cycle where repeated cycles of erasing and programming degrade memory cell performance. Eventually, the cell performance is degraded to such a degree that the memory cell can no longer be used to store data.

In an effort to facilitate the use of flash products in applications such as cellular phones, memory management software interfaces have been developed to make the management of data storage in flash devices transparent to the user. The memory management software carries out various operations in the flash memory such as managing code, data and files, reclaiming memory when insufficient erased memory is available for programming new data, and wear-leveling flash blocks to increase cycling endurance. Memory management typically includes functions to support storage of parameter data for EEPROM replacement, data streams for voice recordings and multimedia, Java applets and native code for direct execution, and packetized data downloads. In addition to these operations, the memory management software often ensures that in the event of a power loss, previously programmed data is not lost or corrupted. An example of this type of memory management software is Intel® Flash Data Integrator (FDI) software.

Although conventional flash memory management software has succeeded in increasing the flexibility of flash memory, there is still room for additional improvement. Conventional memory management software has limitations in the area of data management. For example, in some conventional flash memory management software, the memory space of a flash device is partitioned into fixed memory address ranges and either code or data is associated to each of the ranges. Once set at compile time, the range and the type of associated data cannot be changed without recompilation. Consequently, if at a later time a different partitioning between code and data is desired, the ranges defined for the two types of data cannot be modified unless software is recompiled. Additionally, although different flash memory management software perform many of the same functions, the process by which the functions are performed can be very different, with some being more efficient or faster than others.

Conventionally, data stored across multiple segments is organized hierarchically. FIG. 1 flash memory storage 100 grouped into volumes 104. As previously described, to store both programs and data, the memory storage 100 is partitioned into a code volume 106 and a data volume 108. Both the code volume 106 and the data volume 108 may comprise a number of code blocks 109 and data blocks 111. Of these, a data block 111 of the data volume 108, is shown in detail to show how multiple segment data is stored hierarchically by a conventional method. Each data block 111 comprises a group table 112 which serves as a directory for a second level of hierarchy, the sequence tables 116. Each sequence table 116 in turn serves as a directory for a number of data read/write units 120, in which data actually are stored.

Unfortunately, the hierarchical arrangement shown in FIG. 1 presents at least two concerns. First, writing data to a data read/write unit 120 not only necessitates erasing and rewriting the block or blocks of flash memory where the data read/write unit 120 resides, but also can invalidate tables in which the data read/write units 120 are indexed. In particular, in the hierarchical system shown in FIG. 1, changing data in the multiple segment data object can necessitate changing both the sequence table 116 in which the relevant data read/write units 120 are indexed, and the group table 112 in which the sequence tables 116 are indexed. Therefore, writing to a data read/write unit 120 stored in even a single flash memory block 100 may result in having to erase and rewrite not only that block, but also having to erase and rewrite other blocks 100 where the sequence table 116 and group table 112 reside. Having to rewrite not only the data read/write units 120, but also two levels of tables is both time consuming and also consumes the useful life of the flash memory cells by necessitating even more erase and write cycles.

Second, this hierarchical structure restricts the size or number of data segments that can be stored, segments that can be stored, which are fixed due to the system configuration and cannot be changed until the system configuration is changed, the software is recompiled, and the data volume is formatted again. In this hierarchical structure, there is a maximum number of entries for both a group table 112 and a sequence table 116. Accordingly, if a segment of data requires more data read/write units 120 than can be listed in a sequence table 116, or the number of read/write units 120 used fills more sequence tables 116 than can be listed in a group table 112, that element of data cannot be stored as a single data element. At the same time, if the data segments are very small, because of the maximum number of entries allowable in a sequence table 116, part of a volume may be unused because there cannot be enough table entries to point to all the separate entries to be made.

Therefore, there is a need for alternative memory management processes to allow for more flexibility in data storage in flash memory and related devices. It is to this need that the present invention is directed.

SUMMARY OF THE INVENTION

The present invention is directed to management of multiple segment data objects. In a flash memory or other non-volatile memory devices, the present invention provides a method for non-linear storage of relatively large bodies of data using a data structure having a plurality of index table objects and a plurality of data segment objects. Each index table object contains an index table header and an index table. The invention uses an index table headers to specify parameters about each of the index table objects, index tables, and data object therein stored, and an index table to reference the data segment objects referenced by the index table object. Each data segment object contains a data segment header and data. The index table objects and data segment objects can be stored across a plurality of container objects, and the container objects themselves can be stored in multiple memory blocks.

More specifically, the index table header of index table object contains fields specifying the state of the index table object, the size of the header, a designation that the data is an index table object, a key uniquely signifying the data object, a key uniquely signifying this index table object, the size of the associated index table, a key specifying the next index table object, and an optional time stamp. The index table contains references to the data segment objects in which data is stored. The index table object or the data segment objects can be stored together or in separate locations in memory. One index table object can be used to define the parameters and store the references for all of the data segment objects of a multiple segment data object, or multiple index table objects can be used to reference to the data segment objects.

The data segment objects can be stored together or in separate locations in memory. A data segment header contains fields specifying the state of the segment data object, the size of the header, a designation that the data is a data segment object, a key uniquely signifying the data segment object, a key signifying the index table object referencing the data segment, a key uniquely signifying the data segment object, the size of the portion of the data, and an optional timestamp. Actual data is stored following the data segment header. Data segment objects can be stored in multiple container objects, and those container objects can themselves be stored in different flash blocks, and thus are limited only by the capacity of the memory system itself, and not by constraints inherent in the data management system.

BRIEF DESCRIPTION OF THE DRAWINGS

FIG. 3B is a block representation of an index table object in accordance with an embodiment of the present invention.

FIG. 3C is a table showing data states used by the index table objects and data segment objects in accordance with an embodiment of the present invention.

DETAILED DESCRIPTION OF THE INVENTION

Embodiments of the present invention are directed to a memory management operation and structure that provides flexibility in handling multiple segment data objects. In the following detailed description of exemplary embodiments of the invention, reference is made to the accompanying drawings, which form a part hereof, and in which are shown, by way of illustration, specific exemplary embodiments in which the invention may be practiced. These embodiments are described in sufficient detail to enable those skilled in the art to practice the invention. However, it will be clear to one skilled in the art that the invention may be practiced without these particular details. Other embodiments may be utilized and modifications may be made without departing from the spirit or scope of the present invention. The following detailed description is, therefore, not to be taken in a limiting sense, and the scope of the present invention is defined only by the appended claims.

Figure 1:
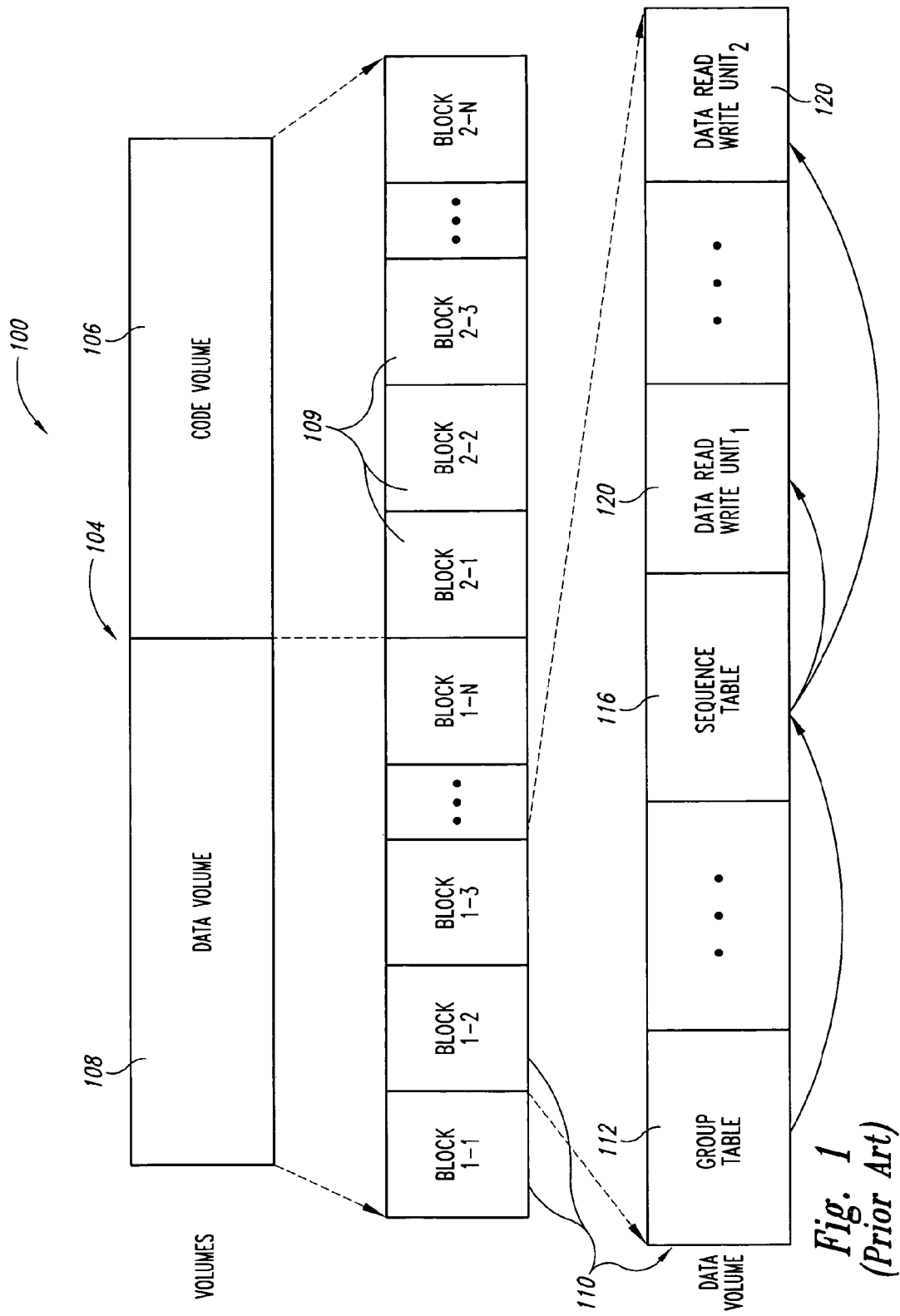
FIG. 1 is a block representation of a conventional method of storing data in multiple segments in a flash memory device.
Figure 2:
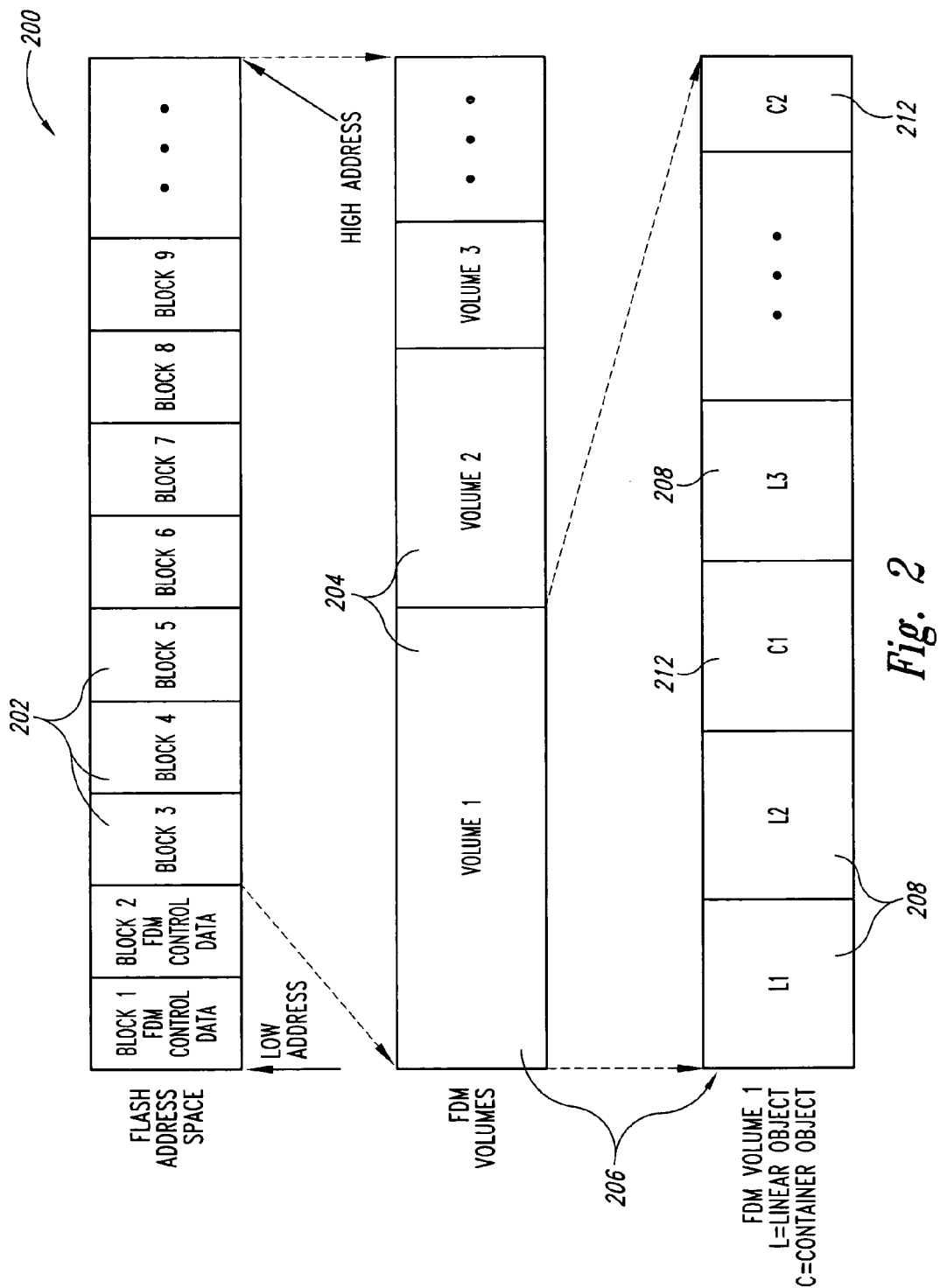
FIG. 2 is a block representation of blocks of flash memory being assigned to volumes and, in turn, as allocated as linear objects and container objects.

FIG. 2 shows a data architecture 200 according to an embodiment of the present invention. The data architecture 200 can be used in a flash data manager (FDM) process to handle data objects in a flash memory device. The data architecture 200 associates FDM volumes 204 to the physical flash memory blocks 202 of one or more flash memory devices. Generally, the FDM volumes 204 can be variable in size, and may be modified by a user subsequent to compile time of the user's application. As a result, the boundaries of an FDM volumes 204 can be adjusted during run time of an application. The FDM volumes 204 can also span multiple flash memory blocks 202 and have boundaries that do not need to correspond to flash memory block boundaries. However, in this case, additional overhead is required to process partial flash memory blocks during erasing and writing operations. A more detailed description of the FDM volumes 204 and object management thereof is provided in commonly assigned, co-pending U.S. application Ser. No. 10/232,952, entitled "DYNAMIC VOLUME MANAGEMENT," to Wong, filed Aug. 29, 2002, which is incorporated herein by reference.

Each of the FDM volumes 204, such as Volume 1 206, can include linear objects 208 and container objects 212. In embodiments of the present invention, partitioning the memory space of a flash memory into two regions, one for linear data and the other for non-linear data, is not necessary. Consequently, linear objects 208 and other objects, in the form of container objects 212, can be stored anywhere within the available memory space of a flash memory. Embodiments of the present invention allow for more flexible use of the available memory space of a flash memory device, thus, providing the ability for efficient linear and non-linear data storage. The memory space of the flash memory device can be utilized in an open manner, storing data objects in the available memory space independent of the particular type of data, rather than accommodating a fixed partitioned memory space where the location at which data is stored in memory is governed by the particular data type (i.e., either linear or non-linear).

Figure 3A:
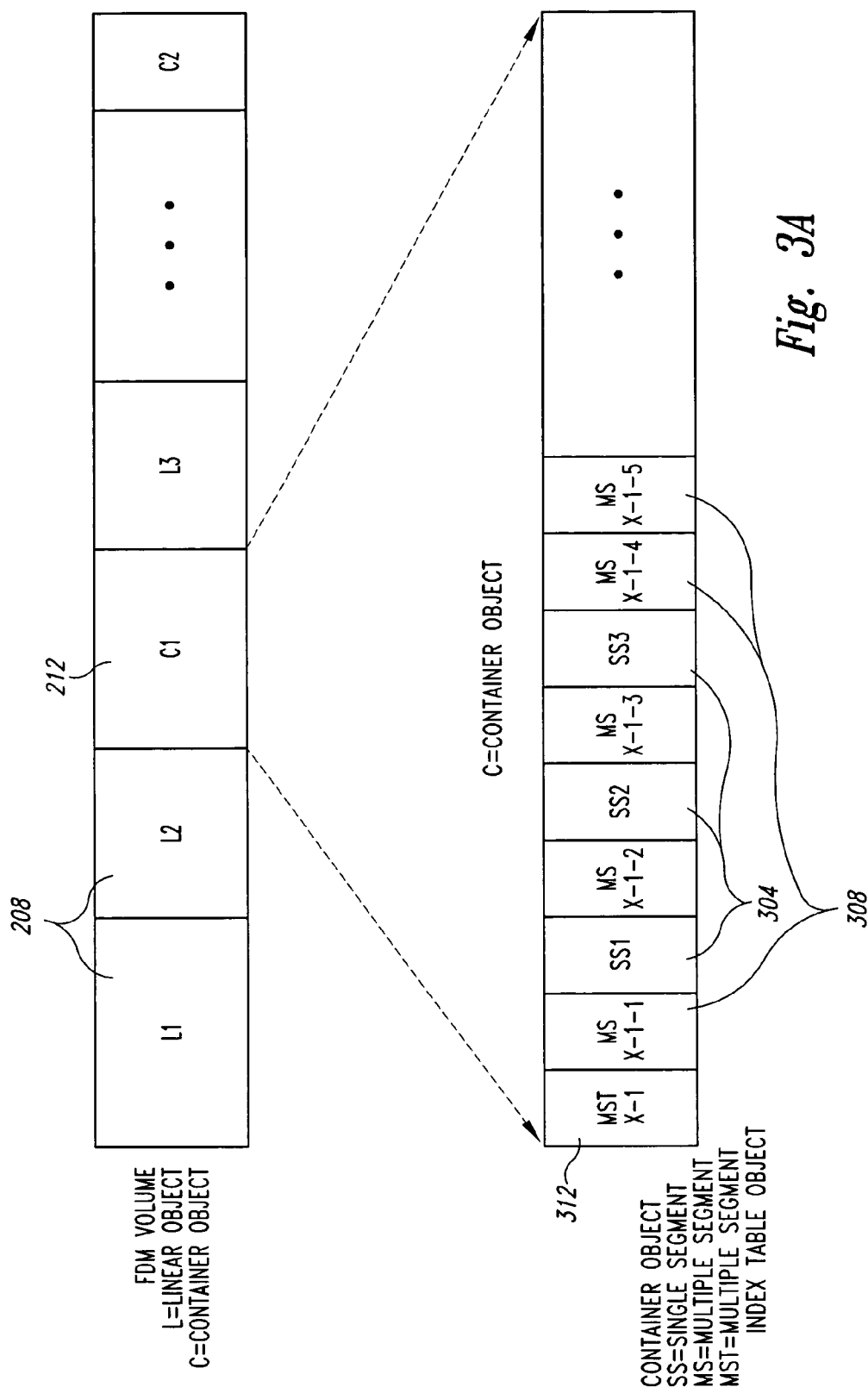
FIG. 3A is a block representation of a series of linear objects and container objects, the container objects storing a plurality of single segment data objects and a multiple segment data object, the multiple segment data object being stored in accordance with an embodiment of the present invention.

FIG. 3A shows in more detail the contents of the container object 212 according to an embodiment of the present invention The container object 212 stores non-linear data in a "linear" fashion, thereby enabling linear and non-linear data to be inter-mixed throughout the available memory space of the flash memory device. In a container object 212 providing for both SS data objects 304 and MS data objects, there are three types of structures: the SS data objects 304 and the MS data segment objects 308, and an MS index table objects 312. As will be further explained, the index table objects 312 comprise an index table header and an index table which need not be stored contiguously. However, for the sake of simplicity of some of the figures, the components of the index table object 312 are represented as being contiguously stored as a single object. SS data objects 304 are relatively small and have data self-contained in a single segment of the memory space. For example, an SS data object 304 might store a telephone number in a user telephone book. SS data objects 304 can be used to store data having a length less than one read/write unit or having a length of multiple read/write units, depending on the expectations of the data to be handled. A read/write unit is typically the minimum byte size that can be stored in memory and perform flash device input/output operations. Additionally, the SS data objects 304 allow for updating "in place" by writing to reserved or erased memory within the memory space allocated for an SS data object 304. In place updating avoids the need to reallocated a new data object whenever data needs to be updated. The SS data objects 304 further provide variable length updating capability so that new data can be of a different length than the data being updated. Management of SS data objects 304 are discussed in greater detail in commonly assigned, co-pending U.S. patent application Ser. No. 10/232,840, entitled "SINGLE SEGMENT DATA OBJECT MANAGEMENT," to Wong et al., filed Aug. 29, 2002, which is incorporated herein by reference.

On the other hand, each of the MS data segment objects 308 store portions of multiple segment data objects which store relatively larger data objects such as graphics images, voice data files, and other larger, non-application code data which can be stored in a nonlinear fashion. Because the MS data segment objects 308 comprise part of an MS data object, the MS index table object 312 identifies a plurality of MS data segment objects 308 storing the MS data object. Using embodiments of the present invention, the length of MS data object is flexible, and writing or updating data requires only changing the affected data segment objects and the affected index table object or objects. Therefore, the data storage is not restricted by a table using a fixed number of entries that would limit the number of MS segments that can be included, or the maximum length of the MS data object as a result of there being a limited number of MS data segment objects allowed.

More specifically, FIG. 3A shows a container object in which a multiple segment data object is stored according to an embodiment of the invention. In the example shown in FIG. 3A, a single index table object 312 is used to index the data segment objects 308 of a multiple segment data object. The single index table object 312 includes header information and reference information for the actual data segment objects 308 storing the actual data of the multiple segment data object which will be explained in more detail in connection with FIG. 3B. The single index table object 312 is identified in FIG. 3A as "MST X-1," to indicate that the index table object references data object X, and the index table object 312 represents the first index table object used to reference the data object. Because only a single index table object 312 is used to index data object X, MST X-1 will be the only index table object for this multiple segment data object. The data segment objects 308 indexed by index table object MST X-1 312 include MS X-1-1, MS X-1-2, MS X-1-3, MS X-1-4, and MS X-1-N, indicating that each segment is part of data object X, are referenced by the first index table object of data object X, and comprise data segment objects 1 through N of the data segment objects referenced by the first index table object.

Although only one multiple segment data object is shown, it will be appreciated that such a data volume could comprise many data objects, each of whose data segment objects are indexed by their own index table objects. Also, in the example shown, the data object has only one index table object, but the present invention places no limits on the number of index table objects that can be used to reference data segment objects comprising parts of data objects that can be created and stored.

FIG. 3B shows in more detail the components of the index table object 312, showing both the index table header 313 and the index table 329 components. In one embodiment of the invention, there are eight fields in the index table header 313:

State 314=State of the index table object;
HeaderLength 316=Length of index table object;
ObjectType 318=Designation of multiple segment index table object;
DataObjectKey 320=Unique data object identifier;
IndexTableKey 322=Unique identifier for this index table object;
IndexTableSize 324=Size of the index table;
NextIndexTableKey 326=Identifier of next index table object—this particular NextIndexTableKey field stores a NULL value to indicate that this index table is the sole index table for the data object; and
TimeStamp 328=Optional timestamp field.

The index table header 313 provides operational parameters of the multiple segment data object. Again referring to the commonly assigned, co-pending U.S. patent application U.S. patent application Ser. No. 10/232,840, entitled "SINGLE SEGMENT DATA OBJECT MANAGEMENT," to Wong et al., filed Aug. 29, 2002, which is incorporated herein by reference, the MS index table header 313 includes analogous content as the "single segment data object header" used to define the parameters of single segment data objects.

With respect to the State field 314, FIG. 3C shows a table of states of the index table object 312 according to an embodiment of the present invention. In summary, the "EMPTY" state indicates free erased memory space available for writing. The "WRITING_HDR_LEN" state indicates that a header length is being written. The "WRITING_HDR" state indicates that the data object header is in the process of being written, such as writing the object state, but there is currently no data stored. The "WRITTEN_HDR" state indicates that the header is complete. The "WRITING_DATA" state indicates that data is being written and the data size is known. The "WRITTEN_DATA" state indicates that data has been written but not yet marked as valid. The WRITTEN_DATA state distinguishes between a copy of an object and the original object during the data copying process, in the event power loss occurs during a reclamation process or an update process. The WRITTEN_DATA state also distinguishes the completed state of the object during the creation of the object for the first time in the event of power loss recovery. The VALID_DATA state indicates that the stored data is valid. The INVALID_DATA state indicates that the data is freed and is eligible for reclamation. As will be explained in more detail below, the granularity of the object states facilitates a power loss recovery process that can be used to recover data in the event of power loss and ensure valid data.

As shown in FIG. 3C, the state of the index table object 312 can be represented by a binary value. Each state change clears a single bit of the binary value. As the state of the data object changes over time, the FDM updates the state field to reflect data transitions from one state to another by programming the value corresponding to the new state. As the state of the data object transitions, for example, from an EMPTY state to a WRITING_HDR_LEN state, and where the least significant bit (LSB) corresponds to the WRITING_HDR_LEN state, the data of the State field 312 will change from 1111 1111 to 1111 1110. As known by those of ordinary skill in the art, in the case of NOR flash memory devices, an unprogrammed (i.e., erased) memory cell of flash memory is represented by a value of "1" and a programmed memory cell is represented by a value of "0". For NAND flash memory devices, this process is inverted. Consequently, in updating the state from EMPTY to WRITING_HDR_LEN, the value 1111 1110 can be written directly to the state field without the need for erasing any cells because only the LSB needs to be programmed to indicate a change in state. The other bits remain unprogrammed. As the state transitions, each succeeding bit gets programmed to reflect the change in states. For example, if the second to the LSB corresponds to a WRITING_HDR state, then the data of the State field 314 is modified from 1111 1110 to 1111 1100 when the state of the data object transitions from the WRITING_HDR_LEN state after the header record and state have been written. It will be appreciated that the previous example was provided for the purpose of illustration, and the correspondence of bits to states can be modified without departing from the scope of the present invention. Consequently, the foregoing example is not intended to limit the scope of the present invention to any particular embodiment.

The index table header 313 (FIG. 3B) also can include HeaderLength field 316. The HeaderLength field 316 specifies the length of the index table header 313, not including the length of the index table 329. Because fields such as the TimeStamp 326 are optional, the index table header 313 can vary in length, thus the length of the index table header 313 needs to be indicated. The index table header 313 also includes an ObjectType 318 identifier which, in this case, signifies that the object is an multiple segment index table object as opposed, for example, to a data segment object 308 or a single segment data object 304. A process for storing single segment data objects is described in the previously incorporated commonly assigned, co-pending U.S. patent application No. _____, entitled "SINGLE SEGMENT DATA OBJECT MANAGEMENT," to Wong et al., filed Aug. 29, 2002.

A DataObjectKey field 320 uniquely identifies the data object for retrieval by the system The MS index table header 313 can also include an IndexTableKey 322 which uniquely identifies the index table object, and an IndexTableSize field 324 which specifies the length of the index table 329, which will be further described below. The next to last field is the NextIndexTableKey field 326. A multiple segment data object can be stored using a plurality of index table objects. In such a case, as will be described below, the index table header 313 includes the NextIndexTableKey field 326 to identify the next index table object used to index data segment objects of the data object. However, in the present example, a single index table object 312 is used to define and index all the data segment objects 308 storing the data of the data object. Accordingly, in this embodiment, the NextIndexTableKey field 326 carries a NULL value to indicate there is only one index table object 312 in the data object. Finally, the TimeStamp field 328 is an optional field which can be used to signify the last time the MS data object or the index table object 312 was last written or revised.

Following the index table header 313 in the index table object is the index table 329. Although the index table header 313 and the index table 329 need not be contiguously stored, they are shown as contiguously stored in FIG. 3B for simplicity of illustration. Index entries 330 in the index table 329 identify the data segment objects 308 storing the data. In the embodiment shown, each index entry 330 has two components. The first component is a container identifier 331. Using embodiments of the present invention, as previously described, data objects can be stored across multiple different container objects. Accordingly, the container identifier 331 identifies the container object in which the data segment object 308 is stored. The second component is a data segment key 332, which specifies the unique identifier of the data segment object 308. This unique identifier for the data segment object 308 also appears in the data segment header which will be described below. More specifically, the data segment key 332 references each data segment object 308 by the data object key, the index table key, and each segment's own segment key of the segments indexed by the index table 329. Considering the data segment objects 308 shown in FIG. 3B, for example, "MS X-1-1" has a key of X-1-1, signifying it is associated with data object X, is referenced by the first index table header and index table, and is the first segment indexed. Similarly, "MS X-1-2" has a key of X-1-2, signifying it is associated with data object X, is referenced by the first index table object, and is the second segment indexed.

It will be appreciated that, in this example using only one index table object, all of the data keys will implicitly specify that the segments are associated with the first index table object and with one data object. The index entries 330 do not actually specify the data object or the index table object because these are identified by appropriate fields in the index table header 313. Drawing from these fields in the index table header 313, therefore, the index entries 330 need only specify the container object and the data segment key to uniquely identify each data segment object 308. As will be explained below, using embodiments of the present invention, data segment objects 308, may be part of and reference different data objects and/o different index table objects.

It should be noted that embodiments of the present invention do not restrict the number of data segment objects 308 that can comprise a multiple segment data object. Accordingly, the size of the data object can be varied by creating data segment objects 308, adding entries 330 in the index table 329 to index the additional data segment objects, and changing the index table size 324 in the index table header 313 of the index table object 312.

Figure 3D:
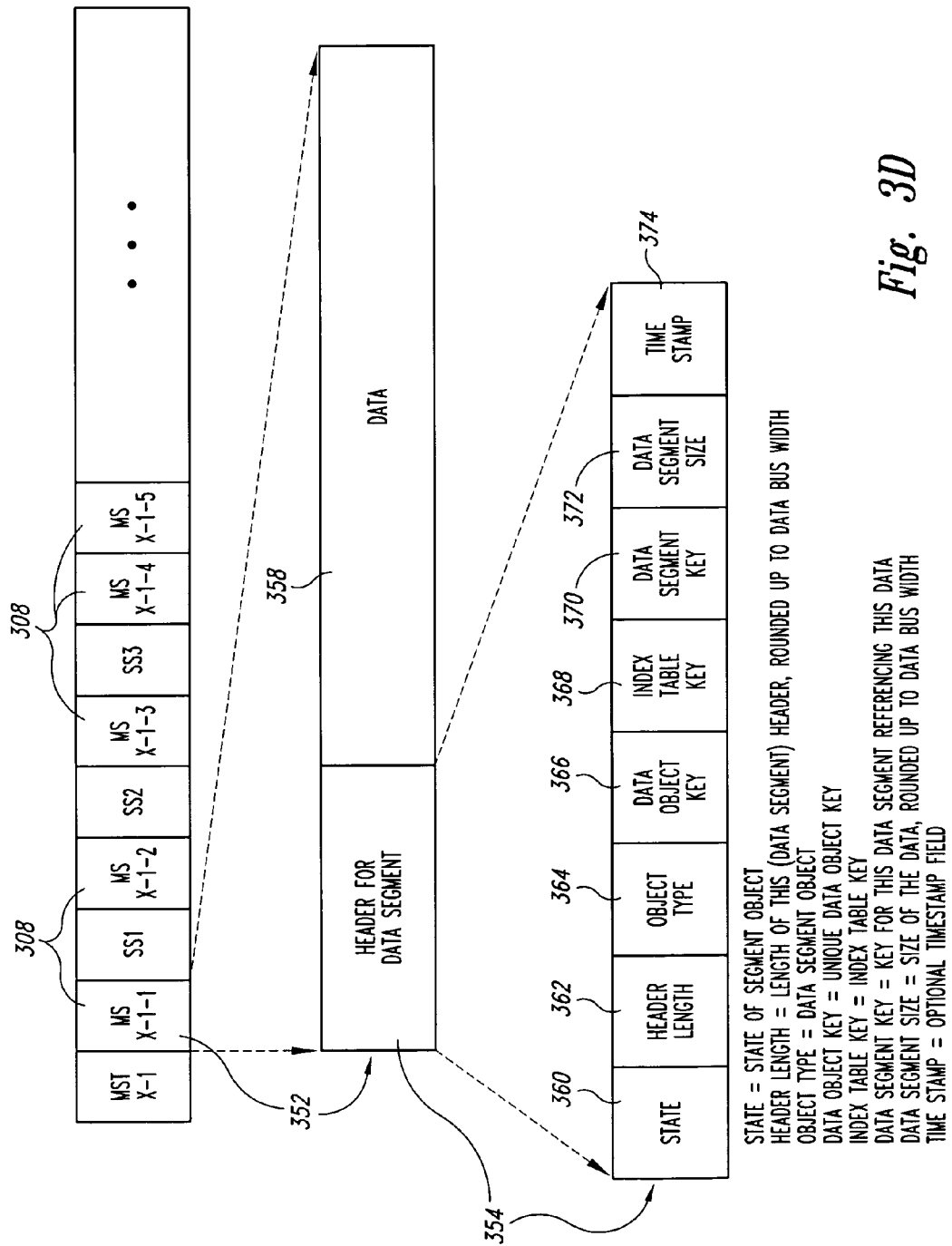
FIG. 3D is a block representation of a data segment object showing a data segment header and a data section in accordance with an embodiment of the present invention.

FIG. 3D shows in greater detail the structure of the MS data segment objects 308. Each of the data segment objects 308 comprises two sections, as shown for MS data segment object MS X-1-1 352: a data segment header 354 and a data section 358. The data segment header 354 comprises eight fields, which one will appreciate are somewhat similar to the fields in the index table header 313 (FIG. 3B). First, a State field 360 stores the state information for the data segment object, the content of which is listed in FIG. 3C. In this embodiment of the invention, the defined states are identical to those previously described in connection with FIG. 3C for the state information stored in the State field 314 of the index table header 313 (FIG. 3B).

In this embodiment of the invention, the data segment header 354 (FIG. 3D) also includes a HeaderLength field 362 which indicates the length of the header 354. Because fields such as the TimeStamp 374 are optional, the data segment header 354 can vary in length, thus the length of the header needs to be indicated. The data segment header 354 also includes an ObjectType 364 identifier which, in this case, signifies that this object is a data segment object.

A DataObjectKey field 366 uniquely identifies the data object of which the data segment object 352 is a part. In this embodiment, the data segment header 354 (FIG. 3D) can also include an IndexTableKey 368 which identifies the index table (not shown) which indexes the data segment object 352. The data segment header 354 also comprises DataSegmentKey 370, which is the same identifier assigned to this data segment object 352 and appearing in the entry 330 (FIG. 3B) in index table 329 for this particular data segment object. The next to last field is the DataSegmentSize field 372 which specifies the size of the data segment object 352 which, according to embodiments of the present invention, can be of variable length. The TimeStamp field 328 is an optional field which can be used to signify the last time the data segment object 352 was last written or revised. Finally, the data section 358 of the data segment object 352 contains the actual data stored in the segment.

Various processes of the FDM use the information in the index table header 313 (FIG. 3B) and the data segment header 354 (FIG. 3D) are used by various processes of the FDM in managing the data objects. A power loss recovery process uses the state information for data recovery in the event of a power failure. When a power loss recovery process is performed, the saved data can be restored by examining the state field. A power loss recovery process can make the determination on how to take action based on the state of the index table object as reflected in the index table header 313 and the data segment object as reflected in the data segment header 354. For example, assuming that the object states shown in FIG. 3C, only when the data object has an EMPTY, VALID_DATA, or WRITTEN_DATA state will no action be taken during the power loss recovery process. For all other object states, it is assumed that parts of the data object are unreliable and are ignored by skipping past the appropriate portions of memory. The power loss recovery process will transition the information in the state field of the new data objects having a WRITTEN_DATA state to a VALID_DATA state, and those original data objects having a VALID_DATA state to an INVALID_DATA state. In this manner, uncorrupted data can be guaranteed in the event a write operation is interrupted by power loss. Thus, in the worst case, a power failure during the updating of a data object results in the loss of the new data. The old data remains valid and can be recovered.

A reclamation process also uses the information of the state field to determine when a block of memory can be erased to reclaim memory, namely, when the state of the index table object or a data segment object is in the WRITING_HDR_LEN, WRITING_HDR, WRITTEN_HDR, WRITING_DATA, and INVALID_DATA states. A more detailed description of a reclamation process using the information of the state field is provided in commonly assigned, co-pending U.S. application Ser. No. 10/232,955, entitled "DATA OBJECT MANAGEMENT FOR A RANGE OF FLASH MEMORY," to Wong et al., filed Aug. 29, 2002, which is incorporated herein by reference.

Figure 4A:
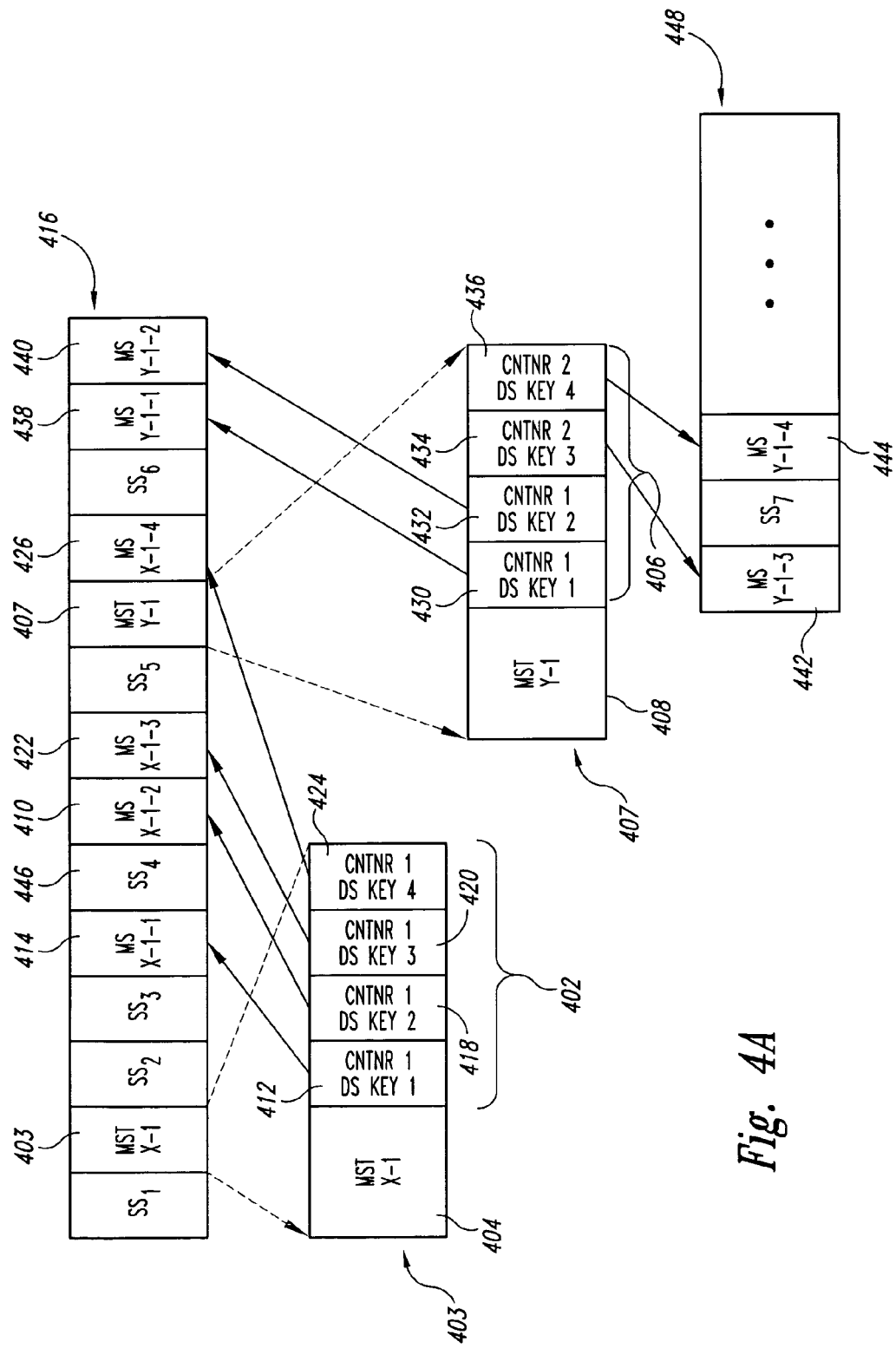
FIG. 4A is a block representation of two multiple segment data objects each using a single index table object to index their data segment objects in accordance with an embodiment of the present invention.

FIG. 4A shows the interrelationship between the index table object 403, comprising index table 402 and index table header X-1 404, and index table object 407, comprising index table 406 and index table header Y-1 408, respectively, and the data segment objects they index. FIG. 4A represents the storage of two separate multiple segment data objects, data object X and data object Y. Again, while the index table objects 403 and 407 are shown as having contiguously stored index tables 402 and 406 and index table headers 404 and 408, this need not be the case in practice. Moreover, the index table objects 403 and 407 need not be contiguously stored with data segment objects they index, as will be further appreciated.

As shown in FIG. 4A, each data segment object, such as data segment object X-1-2 410, is identified by a designation such as "MS X-1-2." In this designation, X is the designation of the data object of which it is a part, the first numerical digit represents the index table key of index table object MST X-1 407, and the second numerical digit represents the segment key, in this case signifying the data segment object is the second data segment object index within index table 402.

For each data segment object making up part of each data object, there is an index entry in the index table 402 and 404 associated with index table object MST X-1 403 and MST Y-1 407, respectively. More specifically, each index entry identifies the container object in which each data segment object is stored, and the data segment key for each data segment object in the index table 406. For example, in the index table 402, there are four index entries. The first index entry 412 references data segment object MS X-1-1 414, the first data segment object indexed in the index table 402 and residing in container object 1 416. The second index entry 418 references data segment object MS X-1-2 410, the second data segment object indexed in the index table 402 and also residing in container object 1 416. Index entry 420 similarly references MS data segment X-1-3 422, and index entry 424 references MS data segment MS X-1-4 426.

MS index table object MST Y-1 407, comprising index table header 408 and index table 406, heads a second MS data object. Index entries 430, 432, 434, 436 reference MS data segment objects MS Y-1-1 438, MS Y-1-2 440, MS Y-1-3 442, and MS Y-1-4 444, respectively. As will be appreciated, the segment designations refer to the data object Y, the index table header 408 and index table 406 of data object Y, and the segment key for each of the data segment objects 438, 440, 442, and 444, within the index table: Entries in the index table 406 indicate the container objects 416 and 448 in which the data segment objects reside.

It will be appreciated that the structure of the multiple segment data objects allows for great flexibility in how the MS data objects actually are stored in memory. For example, data segment objects can be separated by other data segment objects of data, the way that data segment objects MS X-1-1 414 and MS X-1-2 410 are separated by SS data segment object 4 446, or can be contiguously located, such as MS X-1-2 410 and MS X-1-3 422. A data segment object can even be located after another MS index table object, the way that MS X-1-4 426 is located after MST Y-1 407. Also, data segment objects in data object Y headed by MST Y-1 408 reside in two different linear object containers 416 and 448. Data segment objects MS Y-1-1 438 and MS Y-1-2 440 reside in the first linear object container 416, while MS data segment objects MS Y-1-3 442 and MS Y-1-4 44 reside in the second linear object container 448. Storage of data segment objects is flexible using an embodiment of the present invention which, as shown in FIG. 4A, does not require that data segment objects be contiguously stored.

It will be appreciated that using embodiments of the present invention, the length of multiple segment data objects is flexible, and writing or updating data requires only rewriting of the affected index table object and the affected data segment objects. The length of the multiple segment data objects is flexible because index entries can be added to the index tables 402 and 406 for each data segment object added to each data object, updating the index table headers 404 and 408, respectively, as necessary. If not enough space has been allocated for sufficient index entries to identify each of the data segment objects in the data object, a new index table object can be allocated and written elsewhere in the memory space. In any case, the index table objects are not a predefined tables with a fixed number of entries that would limit the number of segments that can be included. Similarly, the maximum length of the data objects is flexible, thus data objects are not restricted to a limited number of data segment objects. Also, writing or updating data, in addition to writing the data segment objects themselves, requires updating of only one index table object. The hierarchy of the described embodiment does not use a secondary group or sequence layer of tables, thereby saving time in updating tables as well as saving wear of degradable flash memory cells.

In the foregoing example of the present invention shown in FIG. 4A, only one index header table object was used to index all the data segment objects of each data object. It will be appreciated by one ordinarily skilled in the art that the index table objects could grow to be large, which could become a consideration when the index table object would have to be changed, reallocated, and rewritten. Accordingly, it may be desirable for larger data objects to have data segment objects indexed by a plurality of shorter index table objects, with new index table objects being allocated when an index table object reaches a certain predetermined length, or based on other considerations.

Figure 4B:
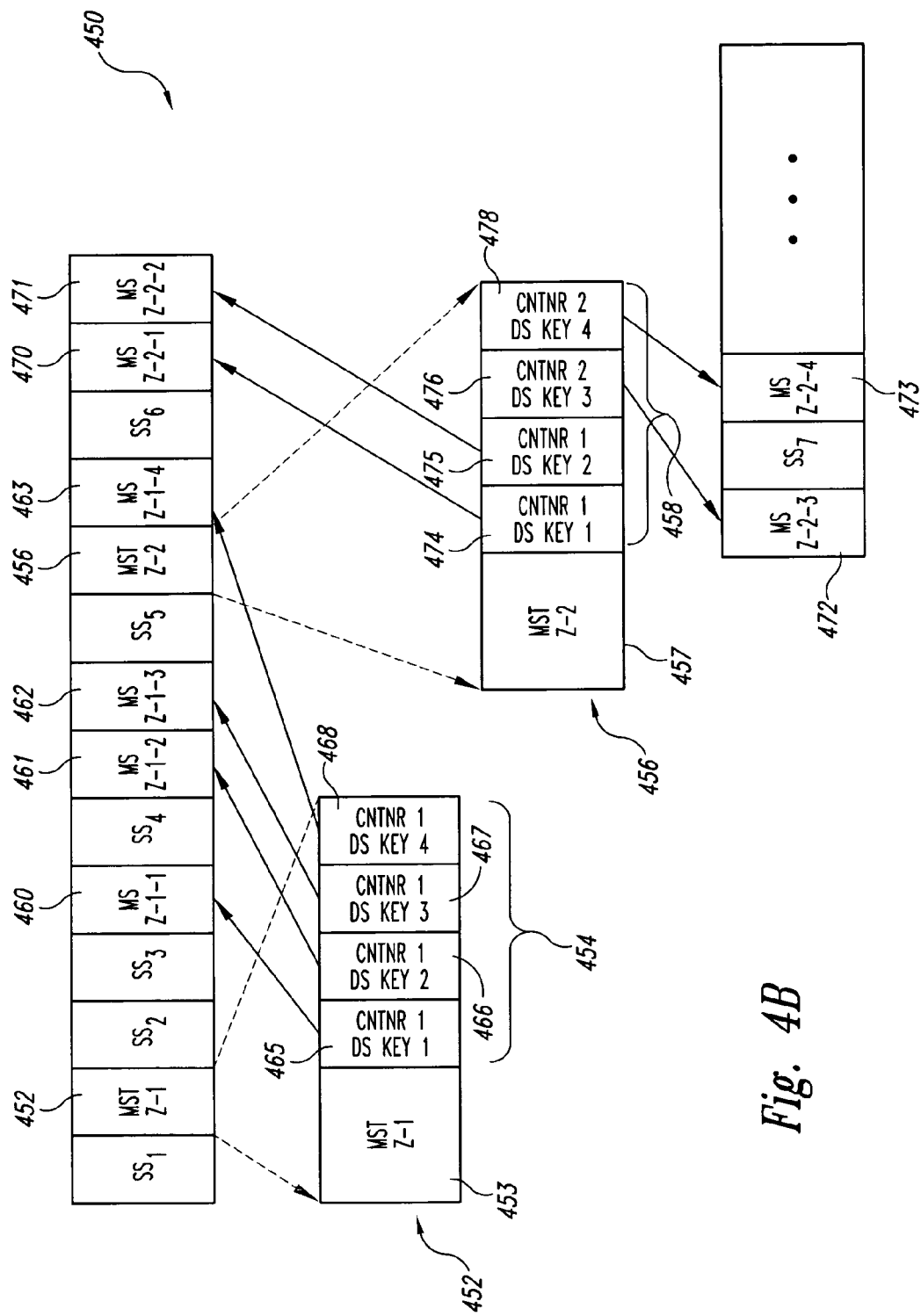
FIG. 4B is a block representation of a single multiple segment data object using two index table objects to index its data segment objects in accordance with an embodiment of the present invention.

The present invention allows for this alternative type of data structure and storage. FIG. 4B shows a single data object stored according to an embodiment of the present invention, but this time the data object is indexed under more than one index table object. Specifically, instead of two data objects, X and Y, being stored, data object Z 450 is stored using two index table objects, index table objects Z-1 452 and Z-2 456.

Index table object MST Z-1 452, having index table header 453 and index table 454, references data segment objects MS Z-1-1 460, MS Z-1-2 461, MS Z-1-3 462, and MS Z-1-4 463, which are referenced by index table entries 465, 466, 467, and 468, respectively. In addition, as part of the same data object, index table object MST Z-2 456, having index table 457 and index table 458, references data segment objects MS Z-2-1 470, MS Z-2-2 471, MS Z-2-3 472, and MS Z-2-4 473, which are referenced by index table entries 474, 475, 476, and 477, respectively. The data segment object designations reflect that the data segment objects are part of the same data objects, as indicated by the designation Z, but are referenced by different index table objects. Data segment objects MS Z-1-1 460, MS Z-1-2 461, MS Z-1-3 462, and MS Z-1-4 463 all indicate they are referenced by index table object MST Z-1 452 because their first numerical digit references the first index table object. On the other hand, data segment objects MS Z-2-1 470, MS Z-2-2 471, MS Z-2-3 472, and MS Z-2-4 473 all indicate they are referenced by index table object Z-2 456 because their first numerical digit references the second index table object.

Using separate index table objects can simplify the process of updating data objects. Because the data segment objects are referenced by different index table objects, if a change in data segment object MS Z-2-1 470 had to be changed, that segment would be updated and/or reallocated as required, and MST Z-2 456 would have to be updated as well. However, index table object MST Z-1 452 would not have to be changed to reflect the change, because the change was to a data segment object not referenced by another index table object. As one with ordinary skill in the art will appreciate, if this were a very lengthy data object with many data segment objects, only having to reallocate and/or revise one smaller index table object would be simpler than having to reallocate and or revise a very large single index table object used to reference all the data segment objects in the data object.

Figure 5:
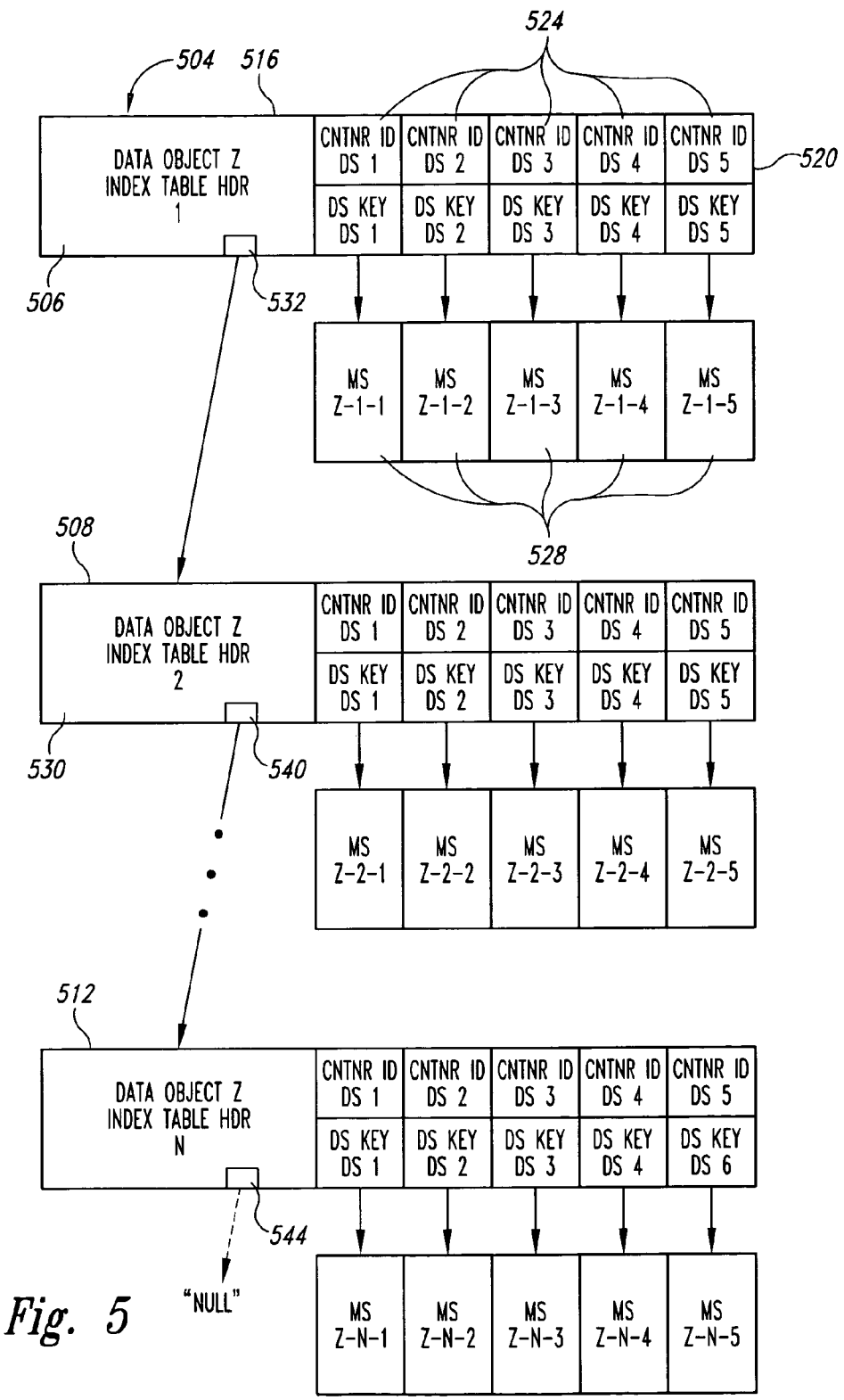
FIG. 5 is a block representation of a multiple segment data object stored using a single multiple index table objects to show the relationship between the index table objects and the data segment objects in accordance with an embodiment of the present invention.

FIG. 5 shows the logical relationship between multiple index table objects 504, 508, and 512 in a data architecture in which data segment objects are stored using multiple index table objects. Each index table object, such as index table object 504, has an index table header 506 and an index table 520. Entries 524 in the index table 520 point to data segment objects 528, which are designated MS Z-1-1 through MS Z-1-5. What FIG. 5 highlights is how the data segment objects of data object Z are linked through their respective index table objects 504, 508, and 512 into a single data object. More specifically, the NextIndexTableKey field 532 of the index table header 506 of index table object 504 references index table object 2 508. In turn, the NextIndexTableKey field 540 of index table header 2 530 of index table object 2 508 in turn references a next index table object, index table object 3 (not shown). As many index table objects can be used as is desired, through index table object N 512. In the last index table header N 512, the NextIndexTableKey field would store a NULL value to indicate it is the last index table object in the data object. It will be appreciated that each of the data segment objects shown in FIG. 5 references Z as their data object, and, the index table object in which they are referenced.

The index table objects can be of different sizes. Because there is no requirement that the index table objects be of equivalent size, changes in the data object do not necessitate changes in all the index table objects. Also, whether using one or more index table objects to reference the data segment objects, the size of the data segment objects is variable and implementation specific.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for storing a body of data in a multiple segment data object, the method comprising:

allocating a plurality of data segment objects of variable length, the data segment objects allocated having sufficient capacity for storing the body of data;

writing to each of the data segment objects allocated a portion of the body of data, an identifier for the segment, and a state of the segment;

allocating an index table object, the index table object comprising an index table header and an index table having sufficient capacity to reference the data segments objects;

identifying in the index table object an object identity representing the body of data, an object data length, and a size of the data segment objects comprising the multiple segment data object;

referencing in the index table object the data segment objects; and variably adapting a multiple segment data object size by allocating at least one data segment object and one of adding or changing only affected data segment objects and the index table object referencing the affected data segment objects.

2. The method of claim 1 further comprising storing the multiple segment data object in data segment objects indexed by a single index table object.

3. The method of claim 1 further comprising storing the multiple segment data object in data segment objects indexed by a plurality of index table objects, with later index table objects each being referenced by a preceding index table object.

4. The method of claim 1 further comprising allowing for adjusting a data segment size by an application program storing the data object.

5. The method of claim 1 further comprising one of updating the single index table object in a same data location to include additional index entries for additional data segment objects or updating the single index table object in a new data location.

6. The method of claim 1 further comprising identifying in the index table header an object type, the object type indicating the body of data represented by the index table object is a multiple segment data object.

7. The method of claim 1 further comprising identifying in the index table header an index table header length.

8. The method of claim 1 further comprising identifying in the index table header the time at which the index table object was last changed.

9. The method of claim 1 further comprising specifying the state of the multiple segment data object is one of EMPTY, WRITING_HDR_LEN, WRITING_HDR, WRITTEN_HDR, WRITING_DATA, WRITTEN_DATA, VALID_DATA, or INVALID_DATA.

10. The method of claim 1 further comprising specifying the state of the segment is one of EMPTY, WRITING_HDR_LEN, WRITING_HDR, WRITTEN_HDR, WRITING_ DATA, WRITTEN_DATA, VALID_DATA, or INVALID_DATA.

11. The method of claim 1 further comprising locating at least some of the plurality of data segment objects in different container objects.

12. The method of claim 11 further comprising locating at least some of the different container objects in different memory blocks.

13. The method of claim 11 further comprising locating the index table header in different container objects than at least one of the index table or at least some of the plurality of data segment objects.

14. The method of claim 1 further comprising reclaiming storage in response to changes in a state of the index table object in the index table header.

15. The method of claim 1 further comprising reclaiming storage in response to changes in the state of the segment in the segment header of the data segment object.

16. A method for storing a body of data in a multiple segment data object, the method comprising:

allocating a plurality of data segment objects of variable length, the data segment objects allocated having sufficient capacity for storing the body of data;

writing to each of the data segment objects allocated a portion of the body of data, an identifier for the segment, and a state of the segment;

allocating an index table object, the index table object comprising an index table header and an index table having sufficient capacity to reference the data segment objects; and identifying in the index table header an object identity representing the body of data, an object data length, and a size of the data segment objects comprising the multiple segment data object.

17. The method of claim 16 further comprising storing the multiple segment data object in data segment objects indexed by a single index table object.

18. The method of claim 16 further comprising storing the multiple segment data object in data segment objects indexed by a plurality of index table objects, with later index table objects each being referenced by a preceding index table object.

19. The method of claim 16 further comprising variably adapting a multiple segment data object size by allocating at least one data segment object and one of adding or updating affected data segment object and an index table object referencing the data segment object.

20. The method of claim 16 further comprising allowing for adjusting a data segment size by an application program storing the data object.

21. The method of claim 16 further comprising one of updating the single index table object in a same data location to include additional index entries for additional data segment objects or updating the single index table header in a new data location.

22. The method of claim 16 further comprising identifying in the index table header an object type, the object type indicating the body of data represented by the index table object is a multiple segment data object.

23. The method of claim 16 further comprising identifying in the index table header an index table header length.

24. The method of claim 16 further comprising identifying in the index table header the time at which the index table object was last changed.

25. The method of claim 16 further comprising specifying the state of the multiple segment data object is one of EMPTY, WRITING_HDR LEN, WRITING_HDR, WRITTEN_HDR, WRITING_DATA, WRITTEN_DATA, VALID_DATA, or INVALID_DATA.

26. The method of claim 16 further comprising specifying the state of the segment is one of EMPTY, WRITING_HDR_LEN, WRITING_HDR, WRITTEN_HDR, WRITING_ DATA, WRITTEN_DATA, VALID_DATA, or INVALID_DATA.

27. The method of claim 16 further comprising locating at least some of the plurality of data segment objects in different container objects.

28. The method of claim 27 further comprising locating at least some of the different container objects in different memory blocks.

29. The method of claim 27 further comprising locating the index table header in different container objects than at least one of the index table or at least some of the plurality of data segment objects.

30. The method of claim 16 further comprising reclaiming storage in response to changes in the state of the index table object in the index table header.

31. The method of claim 16 further comprising reclaiming storage in response to changes in the state of the segment in the segment header in the data segment object.

32. A method for updating a body of data stored in a multiple segment data object, the method comprising:

allocating a new data segment having sufficient capacity for storing an updated portion of data;

writing to the new data segment the updated portion of data, an identifier for the new data segment, and a state of the new data segment;

updating an index table object of the multiple data object an object data length, reflecting an updated size of the multiple segment data object; and indexing in an index table a location of the new data segment.

33. The method of claim 32 further comprising storing the multiple segment data object in data segments indexed by a single index table object.

34. The method of claim 32 further comprising storing the multiple segment data object in data segments indexed by a plurality of index table objects, with later index table objects each being referenced by a preceding index table object.

35. The method of claim 32 further comprising indexing the location of the new data segment in the index table object by writing a new index entry in a previously allocated area of the index table object indicating the location of the new data segment.

36. The method of claim 32 further comprising indexing the location of the new data segment in the index table object by allocating a new index table object with sufficient space to accommodate information stored in an original index table object and a new index entry for the new data segment indicating the location of the new data segment.

* * * * *